(12) United States Patent
Leu (10) Patent No.: US 7,515,439 B2
(45) Date of Patent: Apr. 7, 2009

(54) LOW VOLTAGE STRESS POWER CONVERTER

(75) Inventor: Ching-Shan Leu, Taipei (TW)

(73) Assignee: National Taiwan University of Science & Technology, Taipei (TW)

( * ) Notice: Subject to any disclaimer, the term of this patent is extended or adjusted under 35 U.S.C. 154(b) by 135 days.

(21) Appl. No.: 11/812,339

(22) Filed: Jun. 18, 2007

(65) Prior Publication Data

US 2008/0025051 A1 Jan. 31, 2008

(30) Foreign Application Priority Data

Jul. 26, 2006 (TW) ............... 95127388 A (51) Int. Cl.
*H02M 3/335* (2006.01)
*H02M 7/217* (2006.01)
*H02M 7/5387* (2007.01)

(52) U.S. Cl. .................. 363/16; 363/127; 363/132
(58) Field of Classification Search .................. 363/16, 363/17, 40, 45–48, 88–90, 98, 125, 126, 363/127, 132
See application file for complete search history.

(56) References Cited

U.S. PATENT DOCUMENTS

| 5,038,263 | A | | 8/1991 | Marrero et al. |
| 5,523,936 | A | | 6/1996 | Leu et al. |
| 5,640,318 | A | | 6/1997 | Leu et al. |
| 5,774,345 | A | * | 6/1998 | Yoshida et al. ............... 363/17 |
| 5,786,990 | A | | 7/1998 | Marrero |
| 5,907,479 | A | * | 5/1999 | Leu ............................ 363/16 |
| 6,005,779 | A | | 12/1999 | Cohen |
| 6,252,782 | B1 | * | 6/2001 | Akashi et al. ............... 363/17 |
| 6,927,987 | B2 | * | 8/2005 | Farrington et al. ....... 363/56.02 |

\* cited by examiner

*Primary Examiner*—Jessica Han
(74) *Attorney, Agent, or Firm*—Muncy, Geissler, Olds & Lowe, PLLC (57) ABSTRACT

A circuit used to convert a DC input to an AC output comprises a pair of series circuits, one or two capacitors, and one transformer. Each of the series circuits is in parallel with the DC input and comprises a pair of series-connected switches and at least one transformer primary. Each capacitor couples the two series circuits, and is attached to each series circuit at a node between the respective transformer primary and switch. The center nodes between two series-connected switches are connected together. At least one secondary on the transformer provides the AC output. Optionally, multiple transformers may be utilized. Similar topologies may be used for rectification instead of inversion.

19 Claims, 11 Drawing Sheets

LOW VOLTAGE STRESS POWER CONVERTER

BACKGROUND OF THE INVENTION

1. Field of the Invention

The present invention relates to pulse-width modulation power conversion circuits which implement current ripple reduction and lower voltage stress on both of the active and passive semiconductor switch with minimum component count.

2. Description of the Related Art

Current ripple reduction has been implemented in a variety of circuits, some of which are described in U.S. Pat. No. 5,038,263, issued on Aug. 6, 1991, to Joseph Marrero and Christopher Peng. The voltage stress on the switch is the sum of the input voltage, the transformer reset voltage, and the turn-off voltage spike introduced by the leakage inductance. By series-connecting two switches, a ripple steering circuit has been invented in U.S. Pat. No. 5,786,990, issued on Jul. 28, 1998, to Joseph Marrero. Although the turn-off voltage is shared, voltage stress improvement is limited due to the leakage inductance energy.

Therefore, it is desirable to alleviate the voltage spike as well as to reduce the current ripple in the converter design. Several converters, such as in FIG. 12 of "Snubber Circuits: Theory, Design and Application," Philip C. Todd, Ti seminar 900 topic 2, May 1993, in U.S. Pat. No. 5,523,936, issued on Jun. 4, 1996, to the inventor of the present invention, and in U.S. Pat. No. 6,005,779, issued on Dec. 21, 1999, to Isaac Cohen, are proposed to be able to recycle the leakage energy. Consequently, the voltage spike is eliminated and the voltage stress on the switch can be reduced to the sum of the input voltage and the transformer reset voltage only.

Figure 1:
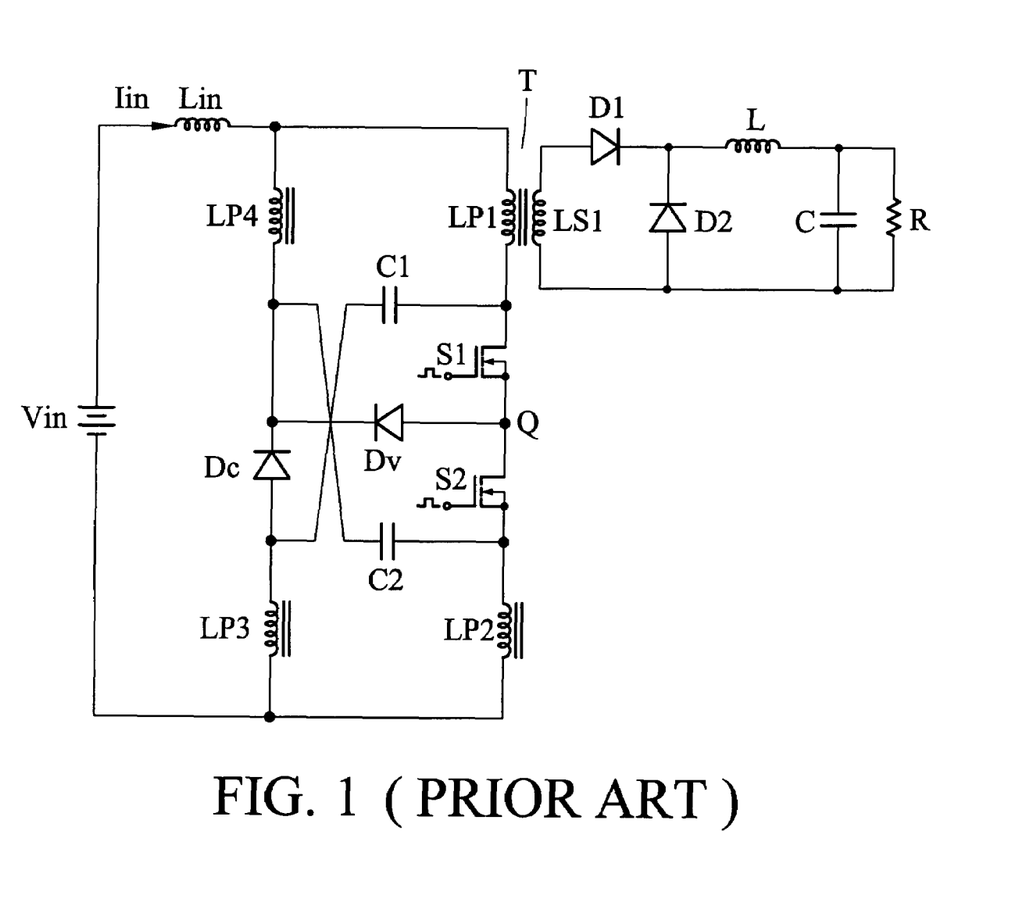
FIG. 1 is a circuit diagram of an invented forward converter as a prior art of the present invention.

To decrease the conduction loss, further reduce the voltage stress is thus desired because lower voltage rating semiconductor switch is accompanied with a lower RDS(on) on MOEFET or a lower VF on diode. As a result, the efficiency of the converter can be improved. Circuitry invented in U.S. Pat. No. 5,640,318, issued on Jun. 17, 1997, to the inventor of the present invention as an improved power conversion circuit of the U.S. Pat. No. 5,523,936. As shown in FIG. 1, the circuit has lower voltage stress on the MOSFET than that in conventional power conversion circuits designed to produce the same output voltage in response to the same input voltage. However, it possesses two drawbacks. First and foremost, a higher voltage rating (at least two times input voltage) clamped diode (Dc) is needed. Secondly, the switch S2 should be turned off first to assure that both MOSFETs are clamped to the input voltage. Or else the switch S1 may suffer a higher voltage stress.

Therefore, it is desirable to assure a lower voltage rating semiconductor switch (MOSFET or diode) can be used and reduced current ripple performance can be achieved with minimum component count in the converter design.

However, it had not been known until the present invention how to achieve the objectives noted in the preceding paragraphs.

BRIEF SUMMARY OF THE INVENTION

An object of the present invention is to provide inversion or rectification circuits for switching mode power converter which has reduced current ripple.

Another object of the present invention is to provide inversion or rectification circuits with leakage inductance and capacitor being a lossless snubber.

A further object of the present invention is to provide inversion or rectification circuits with capacitor for storing and recovering leakage energy thereby improving the converter's efficiency.

A further object of the present invention is to provide inversion or rectification circuits with two low voltage rating semiconductor switches connected in series to overcome the disadvantages mentioned above.

To achieve the foregoing objectives and in accordance with the purpose of the invention as embodied and broadly described herein, there is provided in a circuit to convert a DC voltage received at a DC input to an AC voltage comprises two series circuits and one or two capacitors. Both series circuits connected in parallel with DC input and including two switches and one or two transformer primaries. Each capacitor connected between a node within first series circuit and a node within second series circuit. The center nodes between the two switches within first series circuit and two switches within second series circuit are connected together. At least one transformer secondary magnetically coupled to transformer primaries and providing said AC voltage.

Another embodiment of a circuit to convert an AC voltage received at a primary of a transformer to a DC output comprises two series circuits and one or two capacitors. Both series circuits connected in parallel with DC output and including two switches and one or two transformer secondaries. Each capacitor connected between a node within first series circuit and a node within second series circuit. The center nodes between the two switches within first series circuit and two switches within second series circuit are connected together. At least one transformer primary magnetically coupled to transformer and the circuit's AC output is provided at secondaries of transformer and DC voltage is produced across said parallel combination of series circuits.

Other objects, advantages, and novel features of the invention will become more apparent from the following detailed description when taken in conjunction with the accompanying drawings.

BRIEF DESCRIPTION OF DRAWINGS

The invention can be more fully understood by reading the subsequent detailed description and examples with references made to the accompanying drawings, wherein:

FIG. 3BP and FIG. 3BS are another two embodiments to that shown in FIG. 3B;

FIG. 3CP and FIG. 3CS are another two embodiments to that shown in FIG. 3C;

FIG. 5BP and FIG. 5BS are another two embodiments to that shown in FIG. 5B; and

FIG. 5CP and FIG. 5CS are two embodiments to that shown in FIG. 5C.

DETAILED DESCRIPTION OF THE INVENTION

Figure 2A:
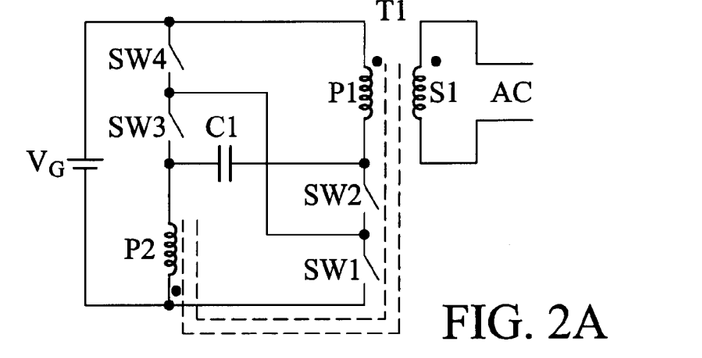
FIG. 2A is a first embodiment accordance with the present invention.

The first embodiment of the present invention, A DC to AC inversion circuit is shown FIG. 2A. A voltage source, $V_G$, provides a DC input to the inversion circuit. Two series circuits are parallel-connected with the DC input. The first series circuit includes primary P1 of transformer T1 and the first switch pair, SW1-SW2. The second series circuit includes the second switch pair, SW3-SW4, and primary P2 of transformer T1. The primaries P1 and P2 of transformer T1 have equal number of turns. Within each series circuit, there is a node at which point the respective switch pair connects with its respective primary. These nodes are coupled by capacitor C1. The center nodes of the first switch pair and the second switch pair are connected together. The circuit's AC output is provided at secondary S1 of transformer T1.

Operationally, the DC voltage, $V_G$, is supplied to charge capacitor C1 via the two transformer primaries (P1 and P2) to the input voltage.

Figure 2B:
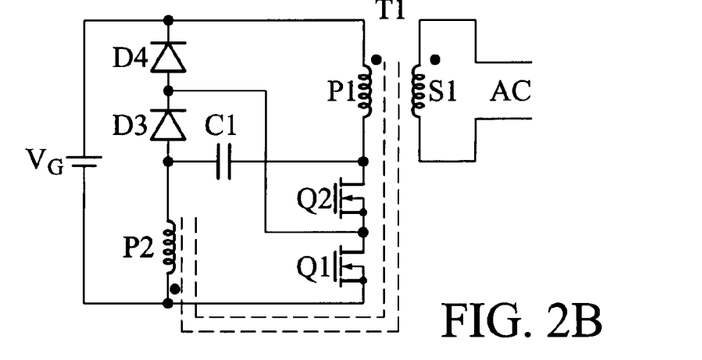
FIG. 2B and FIG. 2C are two embodiments according to the first embodiment of the present invention shown in FIG. 2A.

An embodiment to that shown in FIG. 2A is depicted in FIG. 2B. In this embodiment, the first switch pairs are implemented with two series-connected MOSFETs (Q1-Q2), while the second switch pairs are implemented with two series-connected diodes (D3-D4). When the first switch pair Q1-Q2 is on, it applies the input voltage $V_G$ across primary P1, and connects capacitor C1 (which is charged to a voltage $V_G$) across primary P2. If capacitor C1 has a large value, it will act as a voltage source equal to the input voltage, $V_G$, so that both windings will be active. The voltage stress on the D3 and D4 will be clamped to the input voltage due to the turning on of the Q1 and Q2.

After Q1 and Q2 turn off, the D3 and D4 will be turned on; the input voltage of $V_G$ will be applied to primary P2; and the voltage across capacitor C1 will be applied to primary P1. Thus, the polarity of the voltage applied to the primaries is now reversed to perform the core-reset function. The voltage stress on the Q1 and Q2 will be clamped to the input voltage due to the turning on of the D3 and D4.

As a result of the sequential operation Q1-Q2 and D3-D4, an AC voltage will be generated that will be available from secondary S1.

Figure 2C:
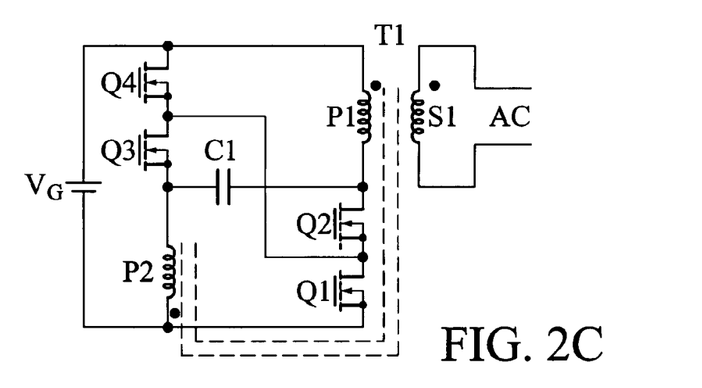

Another embodiment to that shown in FIG. 2A is depicted in FIG. 2C. In this embodiment, the first and the second switch pairs are both implemented with two series-connected MOSFETs (Q1-Q2 and Q3-Q4). Q1-Q2 and Q3-Q4 are operated sequentially with a dead-time delay between their conduction intervals.

When Q1 and Q2 are on, it applies the input voltage $V_G$ across primary P1, and connects capacitor C1 (which is charged to a voltage $V_G$) across primary winding P2. If capacitor C1 has a large value, it will act as a voltage source equal to the input voltage, $V_G$, so that both windings will be active. The voltage stress on the Q3 and Q4 will be clamped to the input voltage due to the turning on the body diodes of the Q1 and Q2.

After Q1 and Q2 turn off and the dead-time delay, the Q3 and Q4 will be turned on; the input voltage of $V_G$ will be applied to primary P2; and the voltage across capacitor C1 will be applied to primary P1. Thus, the polarity of the voltage applied to the primaries is now reversed and both windings will be active. The voltage stress on the Q1 and Q2 will be clamped to the input voltage due to the turning on the body diodes of the Q3 and Q4.

As a result of the sequential operation Q1-Q2 and Q3-Q4, an AC voltage will be generated that will be available from secondary S1.

Figure 3:
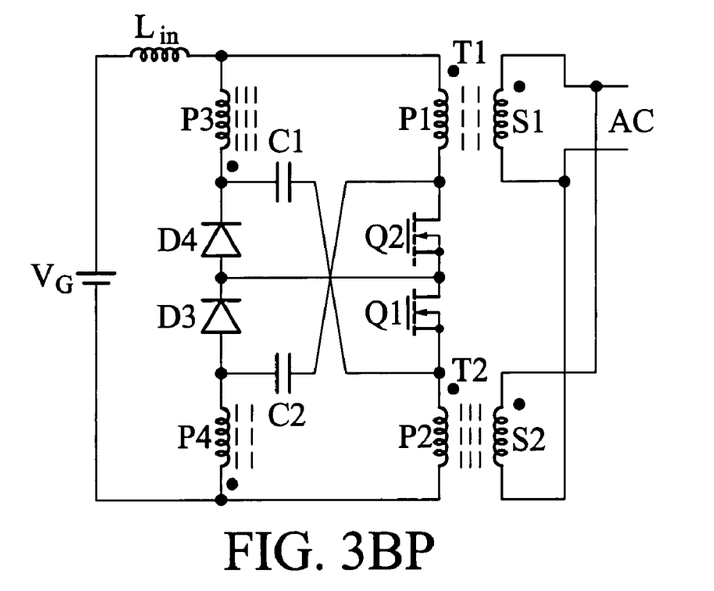
Figure 3A:
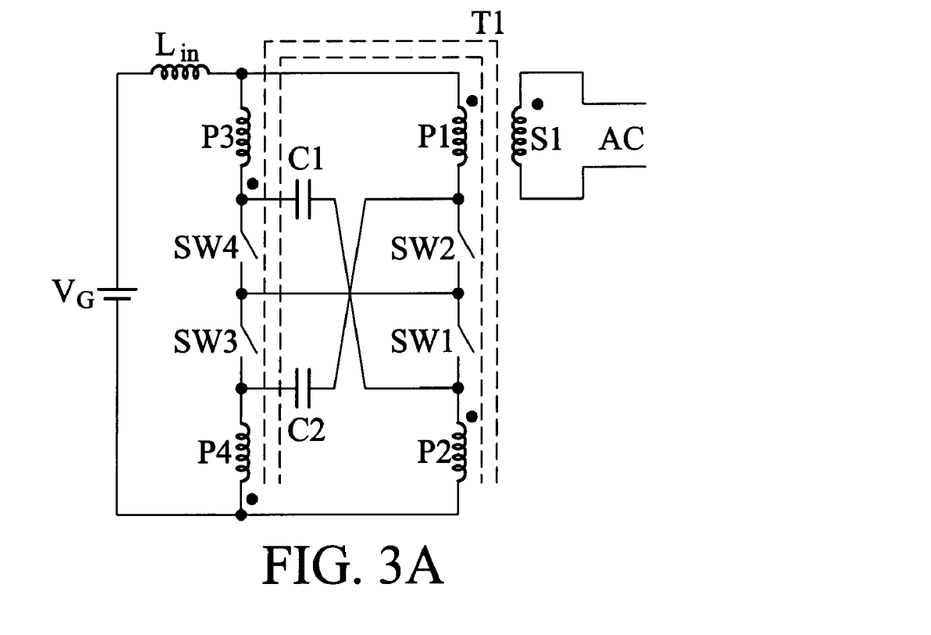
FIG. 3A is a second embodiment accordance with the present invention.

The second embodiment of the present invention, a DC to AC inversion circuit is shown in FIG. 3A. A voltage source, $V_G$, provides a DC input to the inversion circuit. An input inductor, $L_{in}$ (represented the parasitic inductor or an external inductor), is inserted between the DC input and two paralleled series circuits. The first series circuit includes the first primary pair (P1-P2) coupled in series through a first switch pair, SW1-SW2, while the second series circuit includes the second primary pair (P3-P4) coupled in series through a second switch pair, SW3-SW4. The first primary pair (P1-P2) and the second primary pair (P3-P4) are coupled to the same transformer T1 with equal number of turns in each primary. Within each series circuit, there are two nodes at which points the respective switch pair connects with its respective primary. These nodes are coupled by capacitor C1 and C2. The center nodes of the first switch pair and the second switch pair are connected together. The circuit's AC output is provided at secondary S1 of transformer T1.

Operationally, the DC voltage, $V_G$, is supplied to charge capacitors, C1 and C2, via the two respective primary pairs, P2-P3 and P1-P4, to the input voltage during the turn-off time interval of both first switch pair SW1-SW2 and secondary switch pair SW3-SW4.

Figure 3B:
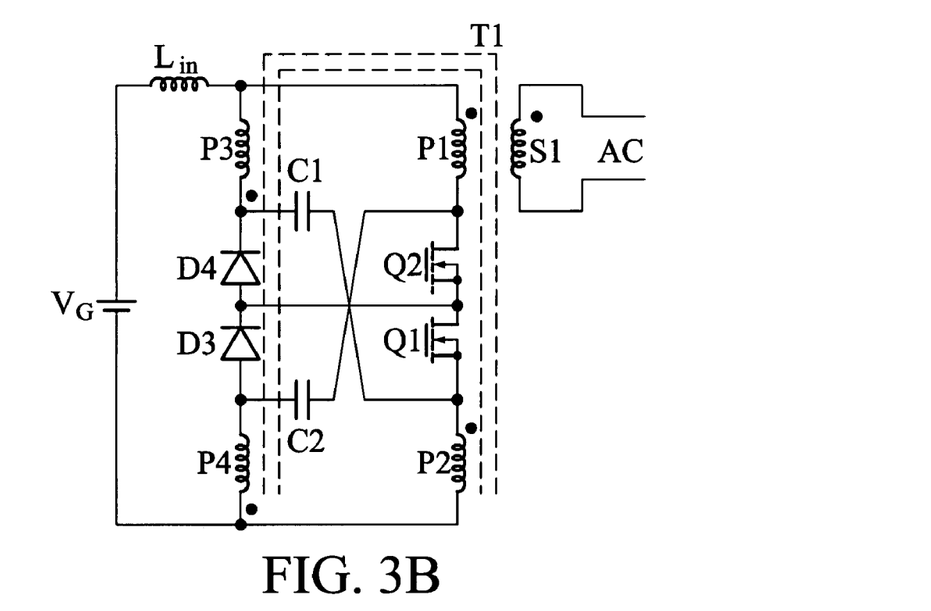
FIG. 3B and FIG. 3C are two embodiments according to the second embodiment of the present invention shown in FIG. 3A.

An embodiment to that shown in FIG. 3A is depicted in FIG. 3B. In this embodiment, the first switch pair is implemented with two series-connected MOSFETs (Q1-Q2), while the second switch pair is implemented with two series-connected diodes (D3-D4). When Q1 and Q2 are on, it applies the input voltage $V_G$ across the primaries P1-P2, and connects capacitors C1 and C2 (which are charged to a voltage $V_G$) across two primary pairs, P3-P1 and P2-P4, respectively. If capacitors C1 and C2 are large enough, VC1 and VC2 act as two voltage sources. Each voltage equals to the input voltage $V_G$, so all the primaries (P1, P2, P3 and P4) will be active. The voltage stress on the D3 and D4 will be clamped to the input voltage due to the turning on of the Q1 and Q2.

After Q1 and Q2 turn off, the D3 and D4 will be turned on; the input voltage of $V_G$ will be applied to primaries P3-P4. Thus, the polarity of the voltage applied to each primary is now reversed to perform the core-reset function. The voltage stress on the Q1 and Q2 will be clamped to the input voltage due to the turning on of the D3 and D4.

As a result of the sequential operation of Q1-Q2 and D3-D4, an AC voltage will be generated that will be available from secondary S1.

Another two alternate embodiments to that shown in FIG. 3B are depicted in FIG. 3BP and FIG. 3BS. In these embodiments, the single transformer T1 has been replaced with two transformers T1 and T2. Primaries P1 and P4 and secondary S1 are coupled to the transformer T1 while primaries P2 and P3 and secondary S2 are coupled to the transformer T2. Secondaries S1 and S2 may also be connected in parallel (FIG. 3BP) or in series (FIG. 3BS).

Figure 3C:
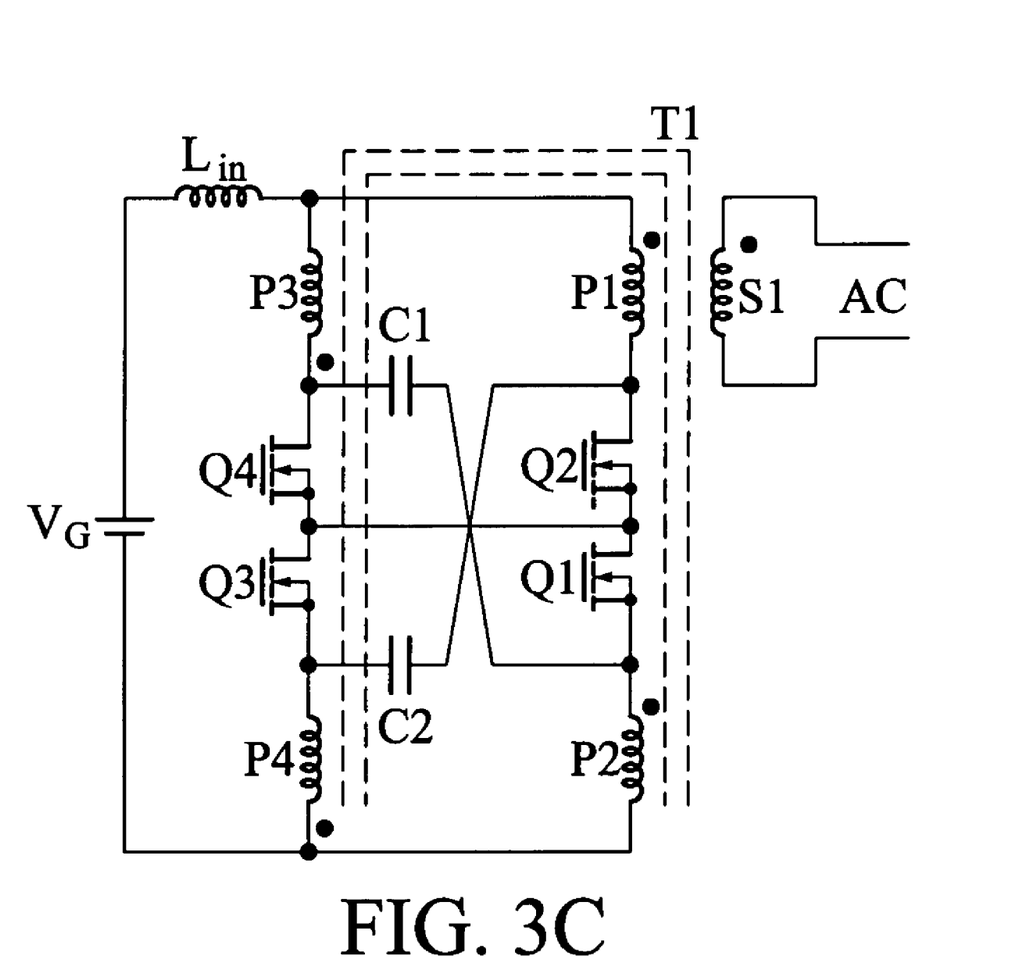

Another embodiment to that shown in FIG. 3A is depicted in FIG. 3C. In this embodiment, the first and the second switch pairs are both implemented with two series-connected MOSFETs (Q1-Q2 and Q3-Q4). Q1-Q2 and Q3-Q4 are operated sequentially with a dead-time delay between their conduction intervals.

When Q1 and Q2 are on, it applies the input voltage $V_G$ across the input inductor and the primaries P1-P2, and connects capacitors C1 and C2 (which are charged to a voltage $V_G$) across two primary pairs, P2-P4 and P1-P3, respectively. If capacitors C1 and C2 are large enough, VC1 and VC2 act as two voltage sources. Each voltage equals to the input voltage $V_G$, so all the primaries (P1, P2, P3 and P4) will be active. The voltage stress on the Q3 and Q4 will be clamped to the input voltage due to the turning on the body diodes of the Q1 and Q2.

After Q1 and Q2 turn off and the dead-time delay, the Q3 and Q4 will be turned on; the input voltage of $V_G$ will be applied to primary P3-P4; and the voltage across capacitors C1 and C2 will be applied to primary pair P4-P2 and P3-P1, respectively. Thus, the polarity of the voltage applied to the primaries is now reversed and all windings will be active. The voltage stress on the Q1 and Q2 will be clamped to the input voltage due to the turning on the body diodes of the Q3 and Q4.

As a result of the sequential operation Q1-Q2 and Q3-Q4, an AC voltage will be generated that will be available from secondary S1.

Two embodiments to that shown in FIG. 3C are depicted in FIG. 3CP and FIG. 3CS. In these embodiments, the single transformer T1 has been replaced with two transformers T1 and T2. Primaries P1 and P4 and secondary S1 are coupled to the transformer T1 while primaries P2 and P3 and secondary S2 are coupled to the transformer T2. Secondaries S1 and S2 may also be connected in parallel (FIG. 3CP) or in series (FIG. 3CS).

The topologies of the present invention may be modified to operate as rectification circuits.

Figure 4A:
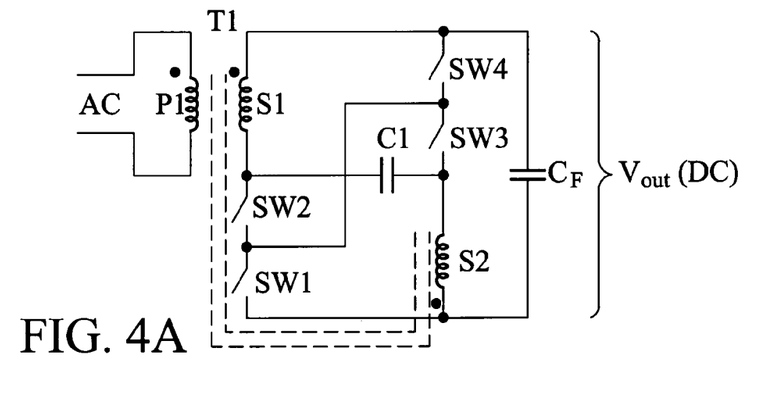
FIG. 4A is a third embodiment accordance with the present invention.

The first rectification circuit in accordance with the present invention is depicted in FIG. 4A. A transformer T1 has at least one primary P1 that is the AC input of the rectification circuit and the secondaries S1 and S2 of transformer T1 have equal number of turns. A first series circuit includes secondary S1 of transformer T1 and a first switch pair SW1-SW2, while a second series circuit including a secondary S2 of transformer T1 and a second switch pair SW3-SW4. Within each series circuit, there is a node at which point the respective switch pair connects with its respective secondary. Two nodes are coupled by capacitor C1. The center nodes of the first switch pair and the second switch pair are connected together. Furthermore, the DC voltage is taken across these two parallel-connected series circuits. Storage/filter capacitor $C_F$ is also connected across the DC voltage.

Figure 4B:
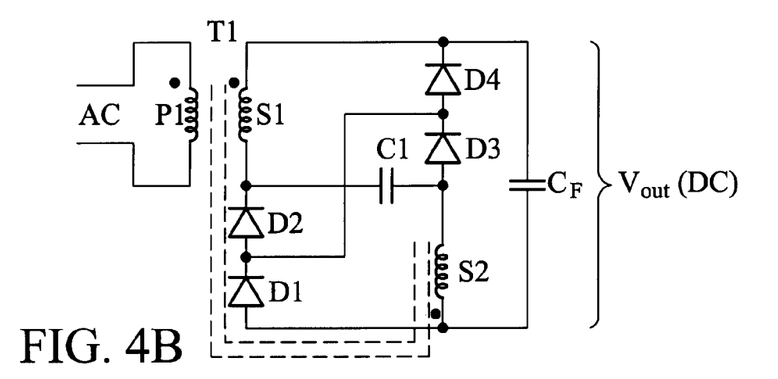
FIG. 4B and FIG. 4C are two embodiments according to the third embodiment of the invention shown in FIG. 4A.

An embodiment to that shown in FIG. 4A is depicted in FIG. 4B. In this embodiment, the first and the second switch pairs are both implemented with two series-connected diodes (D1-D2 and D3-D4).

When the polarity of the primary P1 and the secondaries S1-S2 are positive, secondary S2 will charge capacitor C1 to a voltage Vo and secondary S1 will charge capacitor $C_F$ to an identical voltage Vo, both via the first switch pair D1-D2.

When the polarity of the primary P1 reverses, secondaries S1 and S2 will become negative, and now secondary S1 will charge capacitor C1 to a voltage Vo and secondary S2 will charge capacitor $C_F$ to an identical voltage Vo, both via the second switch pair D3-D4.

During dead-time interval of D1-D2 and D3-D4, the energies stored in C1 and $C_F$ will be discharged to provide the load currents.

As a result, a DC output voltage will appear across $C_F$, with capacitors C1 and $C_F$ being effectively connected in parallel and acting as the output filters.

Figure 4C:
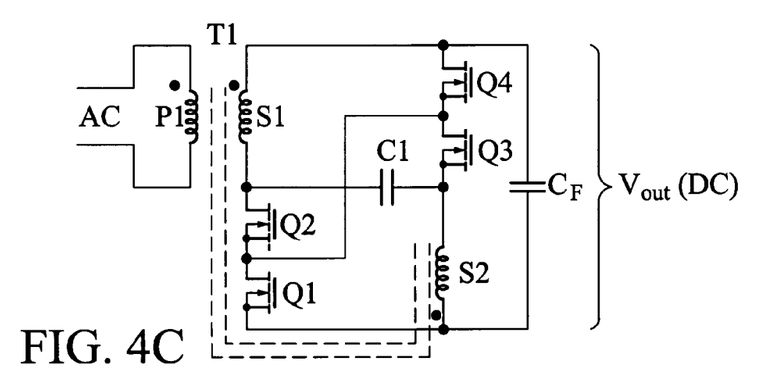

Another embodiment to that shown in FIG. 4A is depicted in FIG. 4C. In this embodiment, the first and the second switch pairs are both implemented with two series-connected MOSFETs (Q1-Q2 and Q3-Q4).

When the polarity of the primary P1 and the secondaries S1-S2 are positive, secondary S2 will charge capacitor C1 to a voltage Vo and secondary S1 will charge capacitor $C_F$ to an identical voltage Vo, both via the first switch pair Q1-Q2.

When the polarity of the primary P1 reverses, secondaries S1 and S2 will become negative, and now secondary S1 will charge capacitor C1 to a voltage Vo and secondary S2 will charge capacitor $C_F$ to an identical voltage Vo both via the second switch pair Q3-Q4.

During dead-time interval of Q1-Q2 and Q3-Q4, the energies stored in C1 and $C_F$ will be discharged to provide the load currents.

As a result, a DC output voltage will appear across $C_F$, with capacitors C1 and $C_F$ being effectively connected in parallel and acting as the output filters.

Figure 5:
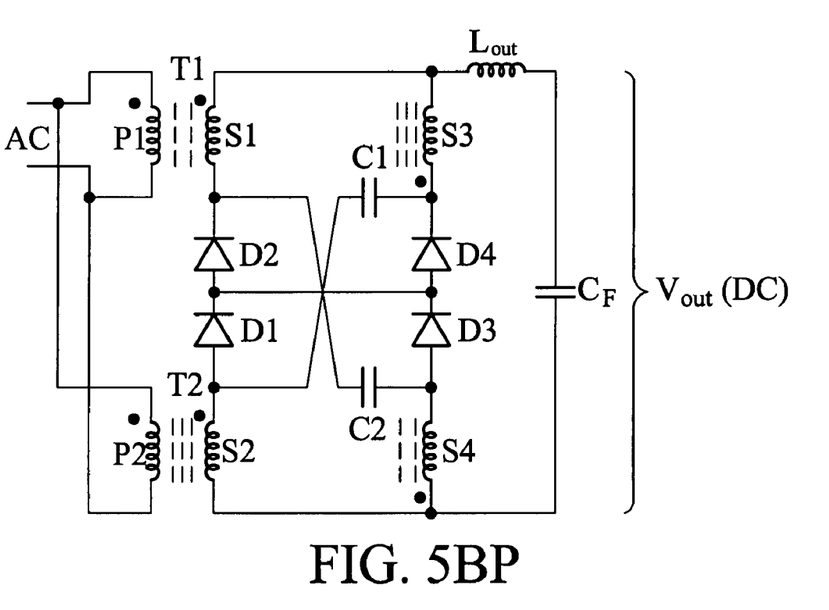
Figure 5A:
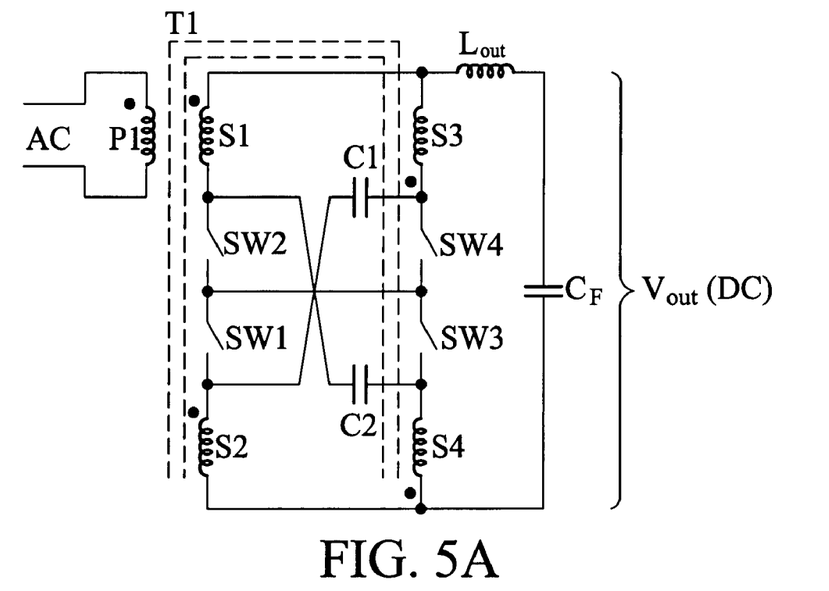
FIG. 5A is a fourth embodiment accordance with the present invention.

The second rectification circuit in accordance with the present invention is depicted in FIG. 5A. A transformer T1 has at least one primary P1 that is the AC input of the rectification circuit and the secondaries of transformer T1 (S1, S2, S3 and S4) have equal number of turns. A first series circuit includes first and second transformer secondaries (S1 and S2), wherein the secondaries are coupled in series through a first switch pair (SW1-SW2); while the second series circuit includes third and fourth transformer secondaries (S3 and S4), wherein the secondaries are coupled in series through a second switch pair (SW3-SW4), wherein the switch pairs can be implemented with two series-connected diodes or active switches. Within each series circuit, there are two nodes at which points the respective switch pair connects with its respective secondary. These nodes are coupled by capacitor C1 and C2. The center nodes of the first switch pair and the second switch pair are connected together. Furthermore, the DC output is taken across these two parallel-connected series circuits. Storage/filter capacitor $C_F$ is also connected across the DC output. An output inductor, $L_{out}$ (represented the parasitic inductor or an external inductor), is inserted between the capacitor $C_F$ and two parallel-connected series circuits.

Figure 5B:
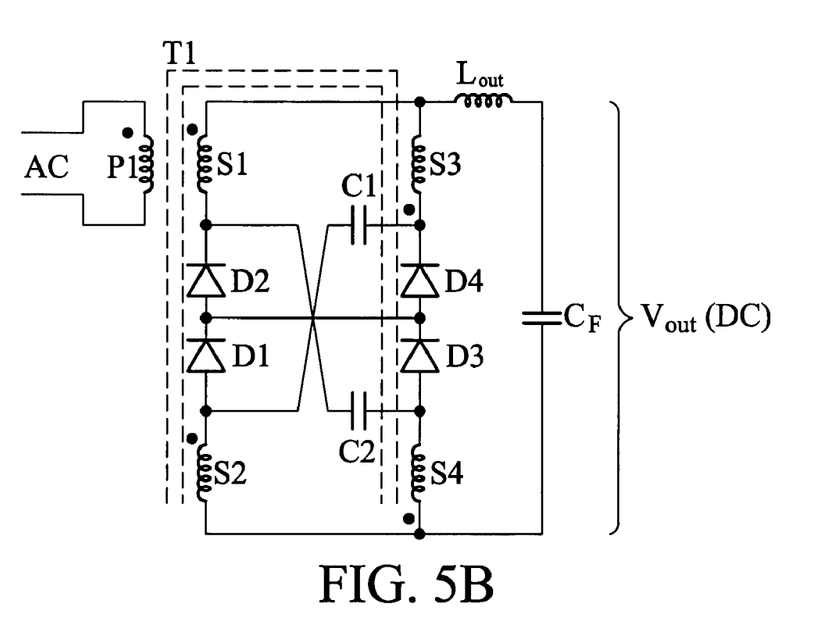
FIG. 5B and FIG. 5C are two embodiments according to the fourth embodiment of the invention shown in FIG. 5A.

An embodiment of the present invention to that shown in FIG. 5A is depicted in FIG. 5B. In this embodiment, the first and the second switch pairs (SW1-SW2 and SW3-SW4) are both implemented with two series-connected diodes (D1-D2 and D3-D4).

When the polarity of the primary P1 and all the secondaries (S1, S2, S3 and S4) are positive, secondary pairs S1-S3 and S2-S4 will charge capacitor C1 and C2 to a voltage Vo and secondary pair S1-S2 will charge capacitor $C_F$ to an identical voltage Vo, all via the same switch pair (D1-D2).

When the polarity of the primary P1 reverses, all the secondaries (S1, S2, S3 and S4) will become negative, and now secondary pair S2-S4 and S1-S3 will charge capacitor C1 and C2 and secondary pair S3-S4 will charge capacitor $C_F$ to an identical voltage Vo, all via the second switch pair (D3-D4).

During dead-time interval, the energies stored in C1, C2 and $C_F$ will be discharged to provide the load currents.

As a result, a DC output voltage will appear across $C_F$, with capacitors C1, C2 and $C_F$ being effectively connected in parallel and acting as the output filters.

Two alternate embodiments to that shown in FIG. 5B are depicted in FIG. 5BP and FIG. 5BS. In these embodiments, the single transformer T1 has been replaced with two transformers T1 and T2. Secondaries S1 and S4 of transformer T1 corresponds to secondaries S1 and S4 of FIG. 5B, while secondaries S2 and S3 of transformer T2 corresponds to secondaries S2 and S3 of FIG. 5B. Primaries P1 and P2 are connected in parallel (FIG. 5BP) or in series (FIG. 5BS) to receive the AC input.

Figure 5C:
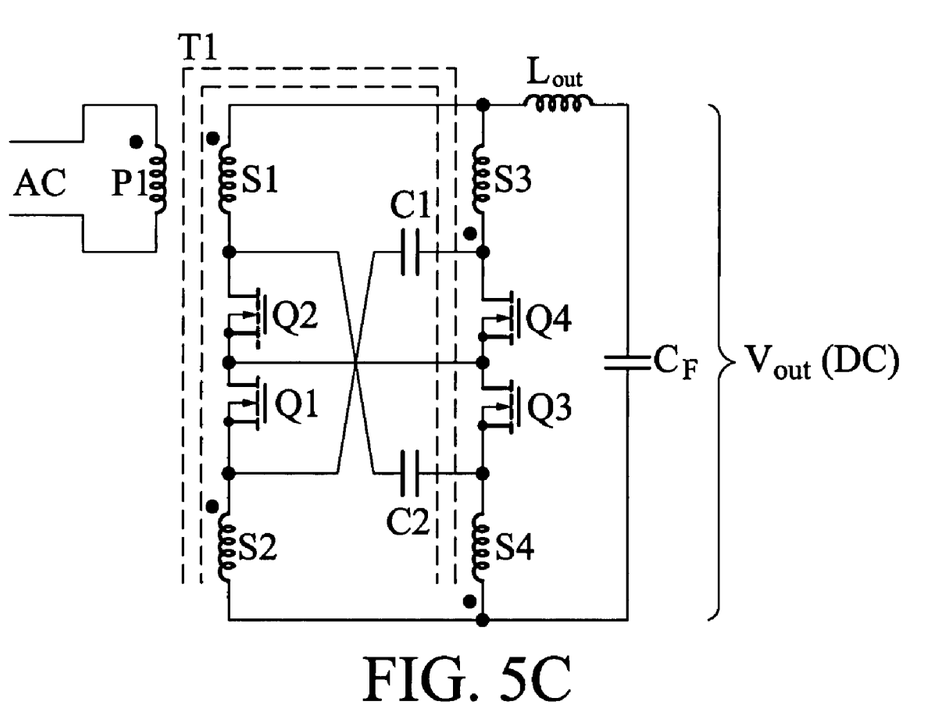

Another embodiment of the present invention to that shown in FIG. 5A is depicted in FIG. 5C. In this embodiment, the first and the second switch pairs (SW1-SW2 and SW3-SW4) are both implemented with two series-connected MOSFETs (Q1-Q2 and Q3-Q4).

When the polarity of the primary P1 and all the secondaries (S1, S2, S3 and S4) are positive, secondary pairs S1-S3 and S2-S4 will charge capacitor C1 and C2 to a voltage Vo and secondary pair S1-S2 will charge capacitor $C_F$ to an identical voltage Vo, all via the same switch pair (Q1-Q2).

When the polarity of the primary P1 reverses, all the secondaries (S1, S2, S3 and S4) will become negative, and now secondary pair S2-S4 and S1-S3 will charge capacitor C1 and C2 and secondary pair S3-S4 will charge capacitor $C_F$ to an identical voltage Vo, all via the second switch pair (Q3-Q4).

During dead-time interval, the energies stored in C1, C2 and $C_F$ will be discharged to provide the load currents.

As a result, a DC output voltage will appear across $C_F$, with capacitors C1, C2 and $C_F$ being effectively connected in parallel and acting as the output filters.

Two alternate embodiments to that shown in FIG. 5C are depicted in FIG. 5CP and FIG. 5CS. In these embodiments, the single transformer T1 has been replaced with two transformers T1 and T2. Secondaries S1 and S4 of transformer T1 corresponds to secondaries S1 and S4 of FIG. 5C, while secondaries S2 and S3 of transformer T2 corresponds to secondaries S2 and S3 of FIG. 5C. Primaries P1 and P2 are connected in parallel (FIG. 5CP) or in series (FIG. 5CS) to receive the AC input.

In the embodiments shown herein switching functions can be performed by any suitable devices known in the art, or later developed. In the preferred embodiments, field-effect transistors are used, however the invention may also use other active semiconductor switches, such as bipolar transistors, IGBT's, or even electromechanical, or micro-machined switch, with parallel-connected diode.

The technologies of the present invention can be combined with topologies of the prior art. For example, in a DC-DC converter, the inversion may be performed by a topology of the prior art and the rectification by the topology of the present invention, or vise versa. Furthermore, both the inversion and rectification can be performed by the techniques disclosed herein.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

What is claimed is:

1. A circuit to convert a DC voltage received at a DC input to an AC voltage, comprising:
   a first series circuit connected in parallel with said DC input and comprising first and second switches and a first transformer primary;
   a second series circuit connected in parallel with said DC input and comprising third and fourth switches and a second transformer primary;
   a capacitor connected between a first node within said first series circuit and a second node within said second series circuit, wherein said first node is between said first transformer primary and said secondary switch, and wherein said second node is between said third switch and said second transformer primary;
   a third node within said first series circuit and a fourth node within said second series circuit are connected together, wherein said third node is between said first switch and said second switch, and said fourth node is between said third switch and said fourth switch; and
   at least one of transformer secondaries magnetically coupled to said first transformer primary and said second transformer primary and providing said AC voltage.

2. The circuit as claimed in claim 1, wherein said first transformer primary and said second transformer primary are primaries of a common transformer, and are magnetically coupled to a same transformer core.

3. The circuit as claimed in claim 1, wherein said switches comprise MOSFETs or active semiconductor switches with parallel-connected diode.

4. The circuit as claimed in claim 1, wherein said switches comprise MOSFETs and diodes.

5. A circuit to convert a DC voltage received at a DC input to an AC voltage, comprising:
   a first series circuit connected in parallel with said DC input and comprising first and second switches and first and second transformer primaries;
   a second series circuit connected in parallel with said DC input and comprising third and fourth switches and third and fourth transformer primaries;
   a first capacitor connected between a first node within said first series circuit and a second node within said second series circuit, wherein said first node is between said second transformer primary and said first switch, and wherein said second node is between said fourth switch and said third transformer primary;
   a second capacitor connected between a third node within said first series circuit and a fourth node within said second series circuit, wherein said third node is between said first transformer primary and said second switch, and wherein said fourth node is between said third switch and said fourth transformer primary;
   a fifth node within said first series circuit and a sixth node within said second series circuit are connected together, wherein said fifth node is between said first switch and said second switch, and said sixth node is between said third switch and said fourth switch; and
   at least one of transformer secondaries magnetically coupled to at least two of said transformer primaries and providing said AC voltage.

6. The circuit as claimed in claim 5, wherein said first transformer primary, said second transformer primary, said third transformer primary and said fourth transformer primary are primaries of a common transformer, and are magnetically coupled to a same transformer core.

7. The circuit as claimed in claim 5, wherein said first transformer primary, said fourth transformer primary and at least one of said transformer secondaries are magnetically coupled to said first transformer, and said second transformer primary, said third transformer primary and at least one of said transformer secondaries are magnetically coupled to said second transformer, said secondaries of said first transformer and said secondaries of said second transformer being electrically connected in one of parallel and series.

8. The circuit as claimed in claim 5, wherein said switches comprise MOSFETs or active semiconductor switches with parallel-connected diode.

9. The circuit as claimed in claim 5, wherein said switches comprise MOSFETs and diodes.

10. The circuit as claimed in claim 5, further comprising an input inductor coupled between said DC input and a connection point of said first series circuit and said second series circuit.

11. A circuit to convert an AC voltage received at a primary of a transformer to a DC voltage, comprising:
- a first series circuit comprising first and secondary switches and a first secondary of said transformer;
- a second series circuit, connected in parallel with said first series circuit and comprising third and fourth switches and a second secondary of said transformer;
- a capacitor connected between a first node within said first series circuit and a second node within said second series circuit, wherein said first node is between said second switch and said first secondary, and wherein said second node is between said third switch and said second secondary; and
- a third node within said first series circuit and a fourth node within said second series circuit are connected together, wherein said third node is between said first switch and said second switch, and said fourth node is between said third switch and said fourth switch, wherein said DC voltage is produced in parallel with said first and second series circuits.

12. The circuit as claimed in claim 11, wherein said switches are selected from the group consisting of MOSFETs, active semiconductor switches with parallel-connected diode, diodes and combinations thereof.

13. The circuit of claim 11, further comprising a capacitor in parallel with said first and second series circuits.

14. A circuit to convert an AC voltage received at a primary of a transformer to a DC voltage, comprising:
- a first series circuit comprising first and secondary switches and first and second secondaries of said transformer;
- a second series circuit, connected in parallel with said first series circuit and comprising third and fourth switches and third and fourth secondaries of said transformer;
- a first capacitor connected between a first node within said first series circuit and a second node within said second series circuit, wherein said first node is between said first switch and said second secondary, and wherein said second node is between said fourth switch and said third secondary;
- a second capacitor connected between a third node within said first series circuit and a fourth node within said second series circuit, wherein said third node is between said second switch and said first secondary, and wherein said fourth node is between said third switch and said fourth secondary; and
- a fifth node within said first series circuit and a sixth node within said second series circuit are connected together, wherein said fifth node is between said first switch and said second switch, and said sixth node is between said third switch and said fourth switch, wherein said DC voltage is produced in parallel with said first and second series circuits.

15. The circuit as claimed in claim 14, wherein said first transformer secondary, said second transformer secondary, said third transformer secondary and said fourth transformer secondary are secondaries of a common transformer, and are magnetically coupled to a same transformer core.

16. The circuit as claimed in claim 14, wherein said first transformer secondary, said fourth transformer secondary and at least one transformer primary are magnetically coupled to a first transformer, and said second transformer secondary, said third transformer secondary and at least one transformer primary are magnetically coupled to a second transformer, said primaries of said first transformer and said primaries of said second transformer being electrically connected in one of parallel and series.

17. The circuit as claimed in claim 14, wherein said switches are selected from the group consisting of MOSFETs, active semiconductor switches with parallel-connected diode, diodes and combinations thereof.

18. The circuit of claim 14, further comprising a capacitor in parallel with said first and second series circuits.

19. The circuit as claimed in claim 18, further comprising an output inductor coupled between said capacitor and a connection point of said first series circuit and said second series circuit.

* * * * *